(12) United States Patent
Kennison et al.

(10) Patent No.: US 12,371,208 B2
(45) Date of Patent: Jul. 29, 2025

(54) SHEET COIL PACKAGING WITH END ATTACHMENT

(71) Applicant: Lamiflex Group AB, Nyköping (SE)

(72) Inventors: John Charles Kennison, Grand Bay, AL (US); Sam Dircksen, Minster, OH (US)

(73) Assignee: Lamiflex GROUP AB, Nyköping (SE)

( * ) Notice: Subject to any disclaimer, the term of this patent is extended or adjusted under 35 U.S.C. 154(b) by 118 days.

(21) Appl. No.: 18/376,893

(22) Filed: Oct. 5, 2023

(65) Prior Publication Data

US 2025/0115384 A1 Apr. 10, 2025

(51) Int. Cl.
| | |
|---|---|
| B65B 11/00 | (2006.01) |
| B25J 9/00 | (2006.01) |
| B65B 11/04 | (2006.01) |
| B65B 41/12 | (2006.01) |
| B65B 45/00 | (2006.01) |
| B65B 61/06 | (2006.01) |

(52) U.S. Cl.
CPC ........... *B65B 11/045* (2013.01); *B25J 9/0084* (2013.01); *B65B 41/12* (2013.01); *B65B 45/00* (2013.01); *B65B 61/06* (2013.01)

(58) Field of Classification Search
CPC ........ B25J 9/0084; B65B 11/45; B65B 41/12; B65B 45/00; B65B 61/06
See application file for complete search history.

(56) References Cited

U.S. PATENT DOCUMENTS

| | | | | |
|---|---|---|---|---|
| 11,142,359 | B2* | 10/2021 | Stone | B65B 25/148 |
| 12,128,556 | B2* | 10/2024 | Hashimoto | B25J 15/0616 |
| 2018/0072441 | A1* | 3/2018 | Tegström | B65B 25/24 |
| 2023/0227188 | A1* | 7/2023 | Olsson | B65B 13/181 |
| | | | | 53/399 |
| 2024/0051692 | A1* | 2/2024 | Robèrt | B25J 9/0084 |
| 2024/0375801 | A1* | 11/2024 | Kennison | B65B 25/148 |
| 2024/0375810 | A1* | 11/2024 | Kennison | B65H 23/00 |

\* cited by examiner

*Primary Examiner* — Eyamindae C Jallow
(74) *Attorney, Agent, or Firm* — MEDLER FERRO WOODHOUSE & MILLS PLLC

(57) ABSTRACT

A system for sheet coil packaging using a roll of wrapping material is provided, including: a sheet coil rotating arrangement; a wrapping tool; an end attachment tool, including a heating arrangement; and first and second industrial robots. The first and second industrial robots have first and second robot arms arranged to: wrap the sheet coil using sequences of the first robot arm inserting the wrapping tool into a central hole of the sheet coil and handing over the wrapping tool to the second robot arm, and the second robot arm transporting the wrapping tool along the outside of the sheet coil and handing it back to the first robot arm; and attach wrapping material from the roll of wrapping material to the wrapping on the sheet coil by heating the wrapping material using the heating arrangement, by the first robot arm moving the end attachment tool so that the heating arrangement becomes positioned to heat the wrapping material.

15 Claims, 9 Drawing Sheets

SHEET COIL PACKAGING WITH END ATTACHMENT

TECHNICAL FIELD

The present disclosure relates generally to systems and methods for sheet coil packaging using a roll of wrapping material.

BACKGROUND

Coils of sheet metal need to be properly wrapped in order to protect the sheet metal during transport and storage. WO2021219861 describes sheet coil wrapping using two robot arms and a wrapping tool. During a wrapping sequence, the first robot arm inserts the wrapping tool into the central hole of the sheet coil and hands it over to the second robot arm, which transports the wrapping tool along the outside of the sheet coil and hands it back to the first robot arm.

PROBLEMS WITH THE PRIOR ART

When the wrapping has finished, the wrapping material (e.g. plastic stretch film) is typically just cut off and left to tack to the wrapping by the self-adhesive properties of the wrapping material. This may lead to partial unwrapping of the wrapping during transportation of the sheet coil. There is thus a need for improved systems and methods for sheet coil packaging using a roll of wrapping material.

SUMMARY

The present disclosure relates to an end attachment tool configured to be coupled to a robot arm of an industrial robot in a system for sheet coil packaging using a roll of wrapping material, e.g. by comprising a coupling tool piece which configured to be mated with a coupling robot piece comprised in the robot arm. The end attachment tool preferably comprises a heating arrangement, arranged to attach wrapping material from the roll of wrapping material to wrapping on a sheet coil by heating the wrapping material. Such an end attachment tool allows for a simple attachment of the end of the wrapping material after the wrapping of a sheet coil.

In embodiments, the end attachment tool comprises a grabbing arrangement, arranged to grab the wrapping material in order to place it into a wrapping material clamp of the robot arm carrying the roll of wrapping material. The wrapping material clamp may be permanently attached to the robot arm, or be a part of the wrapping tool carried by the robot arm.

In embodiments, the end attachment tool comprises a cutting arrangement, arranged to cut off the end of the wrapping material from the roll when the wrapping material has been attached to the wrapping on the sheet coil.

The present disclosure further relates to a system for sheet coil packaging using a roll of wrapping material. The system preferably comprises: a sheet coil rotating arrangement, arranged to rotate a sheet coil; a wrapping tool, carrying a roll of wrapping material; an end attachment tool, comprising a heating arrangement; and first and second industrial robots, having first and second robot arms, each arranged to be able to carry either the wrapping tool or the end attachment tool, wherein the first and second robot arms are arranged to: wrap the sheet coil using sequences of the first robot arm inserting the wrapping tool into a central hole of the sheet coil and handing over the wrapping tool to the second robot arm, and the second robot arm transporting the wrapping tool along the outside of the sheet coil and handing it back to the first robot arm, as the sheet coil is rotated by the sheet coil rotating arrangement; and attach wrapping material from the roll of wrapping material to the wrapping on the sheet coil by heating the wrapping material using the heating arrangement, by the first robot arm moving the end attachment tool so that the heating arrangement becomes positioned to heat the wrapping material. Such a system allows for a simple attachment of the end of the wrapping material after the wrapping of a sheet coil.

In embodiments, the second robot arm is arranged to position the wrapping tool so that the wrapping material maintains tension during the heating.

In embodiments, the end attachment tool comprises a grabbing arrangement, and the first robot arm is arranged to grab the wrapping material using the grabbing arrangement, and place the wrapping material into a wrapping material clamp of the second robot arm, while the second robot arm carries the wrapping tool. The wrapping material clamp may be permanently attached to the second robot arm, or be a part of the wrapping tool carried by the second robot arm.

In embodiments, the end attachment tool comprises a cutting arrangement, and the first robot arm is arranged to cut off the end of the wrapping material from the roll using the cutting arrangement, while the second robot arm positions the wrapping tool so that the wrapping material maintains tension during the cutting.

The present disclosure also relates to a method for sheet coil packaging using a roll of wrapping material. The method preferably comprises: wrapping a sheet coil using first and second industrial robots, having first and second robot arms, arranged to wrap the sheet coil using a wrapping tool carrying a roll of wrapping material, wherein the wrapping of the sheet coil comprises using sequences of the first robot arm inserting the wrapping tool into a central hole of the sheet coil and handing over the wrapping tool to the second robot arm, and the second robot arm transporting the wrapping tool along the outside of the sheet coil and handing it back to the first robot arm, as the sheet coil is rotated by a sheet coil rotating arrangement; and attaching the wrapping material from the roll of wrapping material to the wrapping on the sheet coil by heating the wrapping material using a heating arrangement comprised in an end attachment tool, wherein the attaching of the wrapping material comprises using the first robot arm to position the end attachment tool so that the heating arrangement becomes positioned to heat the wrapping material. Such a method allows for a simple attachment of the end of the wrapping material after the wrapping of a sheet coil.

In embodiments, the attaching of the wrapping material further comprises using the second robot arm to position the wrapping tool so that the wrapping material maintains tension during the heating.

In embodiments, the method comprises: grabbing the wrapping material using a grabbing arrangement comprised in the end attachment tool; and placing the wrapping material into a wrapping material clamp of the second robot arm, while the second robot arm carries the wrapping tool. The wrapping material clamp may be permanently attached to the second robot arm, or be a part of the wrapping tool carried by the second robot arm.

In embodiments, the method comprises cutting off the end of the wrapping material from the roll using a cutting arrangement comprised in the end attachment tool, while the second robot arm positions the wrapping tool so that the wrapping material maintains tension during the cutting.

In embodiments, the heating arrangement comprises a heat gun.

In embodiments, the wrapping material is a plastic stretch film.

In embodiments, the sheet coil is a sheet metal coil.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

When the wrapping of a sheet coil has finished, the wrapping material (e.g. plastic stretch film) is typically just cut off and left to tack to the wrapping by the self-adhesive properties of the wrapping material. This may lead to partial unwrapping of the wrapping during transportation of the sheet coil. This problem is according to the invention solved by the use of an end attachment tool comprising a heating arrangement, arranged to attach wrapping material from the roll of wrapping material to wrapping on a sheet coil by heating the wrapping material. Such an end attachment tool allows for a simple attachment of the end of the wrapping material after the wrapping of the sheet coil.

The present disclosure relates to systems and methods for sheet coil packaging using a roll of wrapping material. Embodiments of the disclosed solution are presented in more detail in connection with the figures.

Figure 1:
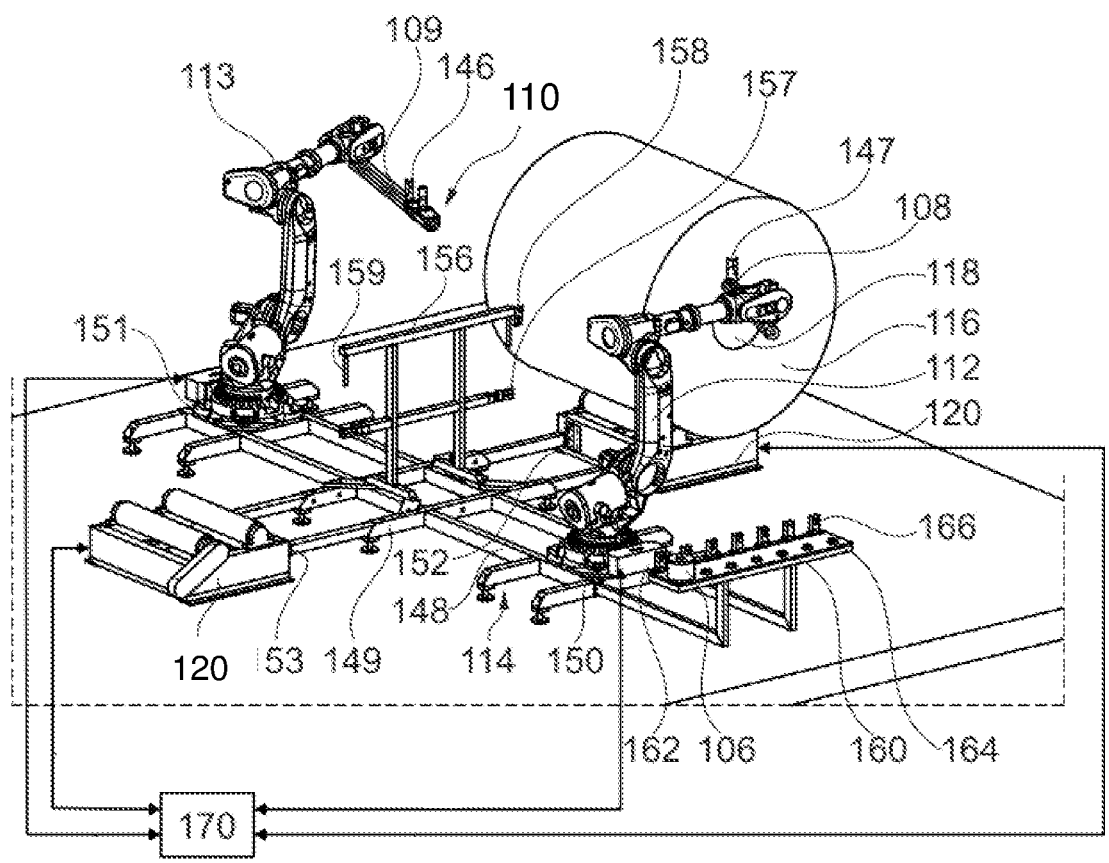
FIG. 1 shows a system for sheet coil packaging using a roll of wrapping material, in accordance with one or more embodiments described herein.

FIG. 1 shows a system 100 for sheet coil packaging comprising two industrial robots 112, 113 arranged to wrap a sheet coil 116 as the sheet coil 116 is rotated by a sheet coil rotating arrangement 120. Each of the industrial robots 112, 113 preferably has a robot arm 108, 109 arranged to wrap the sheet coil 116 using a wrapping tool 110 carrying a roll 106 of wrapping material. The first robot arm 108 inserts the wrapping tool 110 into a central hole 118 of the sheet coil 116 and hands over the wrapping tool 110 to the second robot arm 109. The second robot arm 109 then transports the wrapping tool 110 along the outside of the sheet coil 116 and hands it back to the first robot arm 108. This sequence then continues as the sheet coil 116 is rotated by the sheet coil rotating arrangement 120.

The system 100 may comprise a robot jig 114 having a first 148 and possibly a second 149 intersecting leg. The first leg 148 of the robot jig 114 is configured with first 150 and a second 151 robot base mounts placed apart on said first leg 148. The second leg 149 of the robot jig 114 may be configured with a first coil roller abutment 152 placed at an end of the second leg 149. The sheet coil rotating arrangement 120 may e.g. be positioned in relation to the robot jig 114 with the aid of positioning beams with abutment, so that the sheet coil rotating arrangement 120 will not be in physical or mechanical contact with the robot jig 114 during operation, in order to avoid dynamical forces being conveyed to the robot jig 114. In embodiments configured with two sheet coil stations, the robot jig 114 may comprise two sheet coil rotating arrangements 120, and thus a second coil roller abutment 153 placed at the other end of the second leg 149.

The robot jig 114 shown in FIG. 1 is configured with two robot base mounts 150, 151 placed apart on a first leg of the cross geometry, as well as a first and a second coil roller abutment 152, 153 placed apart on a second leg of the cross geometry. First 112 and second 113 industrial robots are mounted on the respective robot base mounts 150, 151. First and second sheet coil rotating arrangements 120 are placed in the respective coil roller abutments 152, 153. Such sheet coil rotating arrangements 120 are per se known and typically comprise a cradle of two rollers that are actuatable to give a sheet coil 116 placed in the cradle a rotating movement.

In the embodiment shown in FIG. 1, the robot jig 114 is configured with a general cross geometry of substantially perpendicular legs with one or more bars, i.e. the bars making up the legs and thus the one or more bars intersecting at substantially right angles. Other intersecting angles may be configured with adapted configurations of the robots, their range and their movements. In the embodiment shown in FIG. 1, each leg comprises two parallel bars. Other embodiments include only a first leg.

Sheet coils 116 appear in different sizes. A large coil may have a length of 2300 mm, normal sizes are in the range of 1200 to 1500 mm length and down to a minimum that may be 800 mm length. The central hole 118 often has an inner diameter of 508 or 610 mm, and there are diameters as small as 420 mm. The outer diameter of a sheet coil 116 may vary from for example 1 to 2.5 meters. After the wrapping operation in the wrapping station, a crane or similar may be used to lift out the wrapped sheet coil 116 to an after-processing station, where supplementing packing operations may be carried out manually or semi-automatically.

The system 100 may further comprise a wrapping material clamping station 156 placed within reach of at least one robot arm 108, 109, for example placed substantially midway between the industrial robots 112, 113. The wrapping material clamping station 156 may be provided with one or more wrapping material clamps 157, 158 configured to hold a strip of wrapping material. The wrapping material clamping station 156 may e.g. be placed substantially at the intersection of the first and second legs 148, 149 of the robot jig 114, for example substantially midway between the robot base mounts 150, 151. The wrapping material clamping station 156 may be provided with one or more wrapping material clamps 157, 158 configured to hold a strip of wrapping material.

The system 100 may further comprise a roll magazine 160 for storing a plurality of rolls 106 of wrapping material available to one or more of the industrial robots 112, 113. The roll magazine 160 may e.g. be configured with one or more roll places 164, and an associated wrapping material clamp 162, 166 for each roll of wrapping material. The wrapping material clamps 162, 166 may each be configured to hold a strip of wrapping material. The roll magazine 160 may in use be positioned and placed within reach of at least one of the robots, for example at the side of the robot setup or in front of one of the robots e.g. at the side of the coil rotating arrangement 120.

The system 100 may further comprise a measuring arrangement configured to measure the position and dimensions of a sheet coil 116 positioned on a sheet coil rotating arrangement 120 for being packaged with wrapping material. In embodiments, the measuring system comprises one or more laser measuring tools, for example mounted on one of or both robot arms 108, 109. With such a laser measuring tool mounted on the robot arm, it is preferable that it is positioned such that is has an optical line that is unobstructed by a roll of wrapping material attached to the wrapping tool 110. When measuring the position and dimensions, the system 100 is configured to find the center of the coil, follow the contours and calculate the position and the dimensions.

The system 100 may further comprise a robot control system 170 configured to control the movement of the industrial robots 112, 113 in relation to a sheet coil 116 positioned on a sheet coil rotating arrangement 120 in the system 100. The robot control system 170 may comprise input/output interfaces configured to be communicably couplable to the industrial robots 112, 113, to one or more sheet coil rotating arrangements 120, and/or to a human/machine interface (not shown) for example in the form of a GUI generating a dashboard. The robot control system 170 may be used for determining the dimensions of a sheet coil 116 before applying edge protection.

Figure 2A:
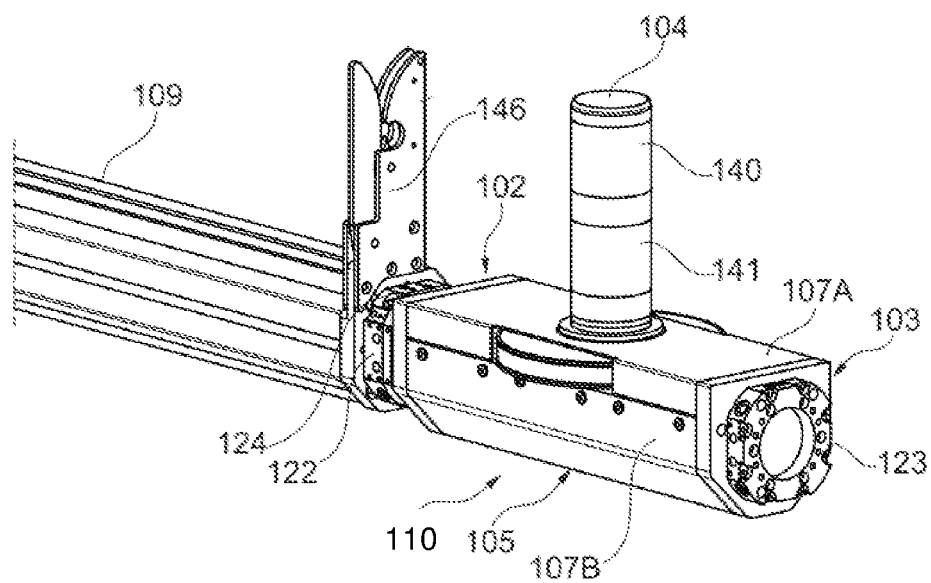
FIGS. 2a-c show a wrapping tool, in accordance with one or more embodiments described herein.
Figure 2B:
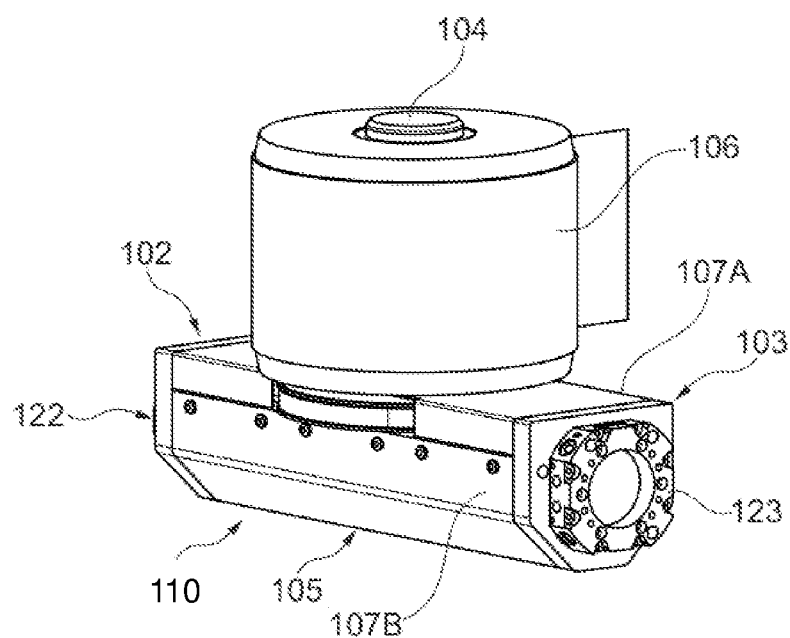
Figure 2C:
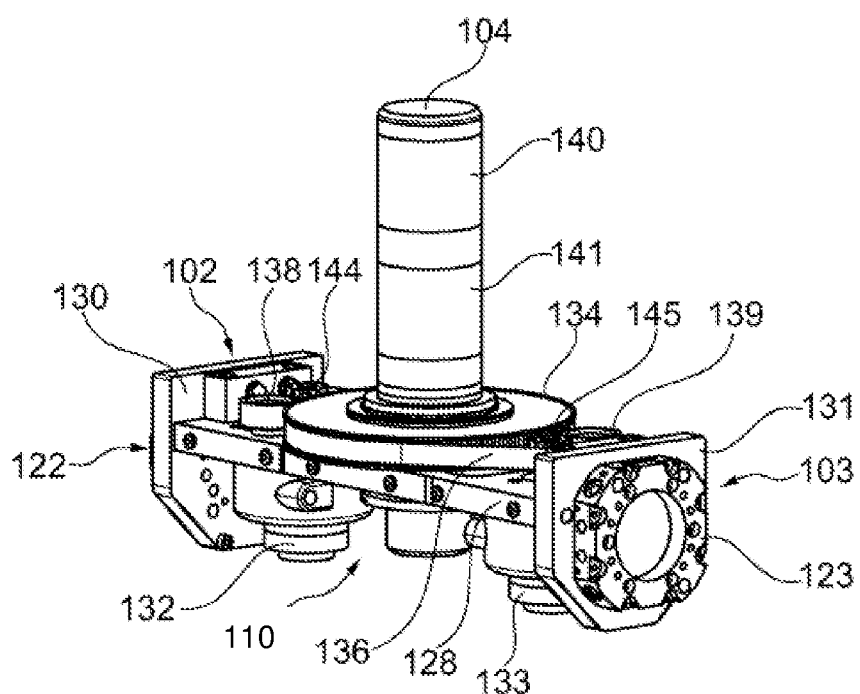

FIG. 2a shows a wrapping tool 110 provided with a roll holder shaft 104 for holding a roll 106 of wrapping material and being configured for handover between robot arms 108, 109, FIG. 2b shows the wrapping tool 110 of FIG. 2a with a roll 106 of wrapping material placed on the roll holder shaft 104, and FIG. 2c shows a more detailed view of the wrapping tool 110.

The wrapping tool 110 preferably comprises two opposing ends 102, 103, each end being provided with a coupling tool piece 122, 123 configured to interface with a robot arm 108, 109. The wrapping tool 110 preferably further comprises a roll holder shaft 104 configured to hold a roll 106 of wrapping material, the holder shaft 104 at one end being rotatably mounted substantially midway between said, preferably opposing, ends 102, 103 and projecting substantially perpendicular to an axis extending between said, preferably opposing, ends 102, 103. The wrapping tool 110 may be provided with a housing 105 comprising one or more cover plates 107A, 107B.

In embodiments, the robot arms 108, 109 are each provided with a coupling robot piece 124, 125, for example a gripper or a robot piece of a tool changer, configured to be able to grip or mate with a respective coupling tool piece 122, 123 of the wrapping tool 110. As shown in FIG. 2a, a robot arm 109 may be coupled to the wrapping tool 110 via a coupling robot piece 124 that is mated with the coupling tool piece 122 to the left in FIG. 2a at one end 102. At the other end 103 of the wrapping tool 110, to the right in FIG. 2a, a second coupling tool piece 123 is available for coupling to another robot arm 108 not shown in FIG. 2a.

The coupling tool pieces 122, 123 of the wrapping tool 110 are preferably configured to be able to convey actuating power from a power supply line of a robot, such as an industrial robot. The actuating power may in different embodiments for example be in the form of pneumatic power, hydraulic power or electric power. The coupling may typically be configured to be couplable by a bayonet coupling and/or locked in position by means of actuation power controlled by the respective robots.

The coupling configured for interfacing between the industrial robots and the wrapping tool 110 may be configured in the form of a wrapping tool changer, with the coupling tool piece 122, 123 configured to be able to mate with a coupling robot piece 124, 125 of said tool changer mounted on a respective robot arm 108, 109. Such couplings may be configured with a presence sensor adapted to detect or indicate that the wrapping tool 110 is attached to the robot arm 108, 109. The presence sensor may e.g. be integrated in the tool changer functionality of the coupling and be based on pneumatic or electric signals that are readable by the robot control system, or arranged at the side of the coupling, for example in the form of an electric presence detector coupled to the robot control system.

The roll holder shaft 104 may comprise a roll fixture 140, 141 configured to releasably fix a roll of wrapping material to the roll holder shaft 104. For example, a portion 140, 141 of the roll holder shaft 104 may be configured to be radially expandable to enable a roll fixture to releasably fix a roll of wrapping material to the roll holder shaft 104. This may e.g. be implemented as one or more inflatable bladders 140, 141 that are controllably inflatable by means of pneumatic power, i.e. pressurized air, conveyed from the respective robots via the coupling interfaces. Alternatively, the roll fixture 140, 141 may be actuatable for example by electric or hydraulic power. An embodiment comprises first and a second radially expandable portions 140, 141 in the form of inflatable bladders on the shaft 104, such that the first expandable portion is configured to fix a roll of wrapping material having a first lesser wideness, and such that the combined first and second expandable portions are configured to fix a roll of wrapping material having a larger wideness.

The wrapping tool 110 may further comprise at least one motor 132, 133 configured to be able to drive, prevent and/or brake rotation of the roll holder shaft 104. This may enable driving of the roll holder shaft 104 in first rotational direction, e.g. forwards, for example to roll out wrapping material from the roll in synchronization with the movement of the robots, or in a second rotational direction, e.g. backwards, for example to roll up or in wrapping material onto the roll in order gather superfluous wrapping material or increase the tension of the wrapping material. This further enables prevention of rotation of the roll, for example in order to keep a rolled out strip of wrapping material at a certain length or to keep a current tension of the wrapping material. Further, this enables braking of the rotation of the roll, for example in order to obtain, vary or keep a certain tension in the roll.

As illustrated in FIG. 2c, pneumatic motors 132, 133 are mounted on the carrier piece 128, at each side of the roll holder shaft 104. The roll holder shaft 104 is provided with a sprocket 134 configured to be engaged by a toothed belt 136. The toothed belt 136 is also engaged with sprockets 144, 145 coupled to the respective motor 132, 133, and is biased by tension wheels 138, 139, preferably mounted as backside idlers on the toothed belt 136.

The embodiment of the wrapping tool 110 shown in FIGS. 2a-c has a basically symmetrical configuration. When a first robot arm is coupled to the wrapping tool 110 at, for example, the right side of the tool to the coupling tool piece 123, the motor 133 and the roll fixture 140, 141 may be actuated by means of pneumatic power, i.e. pressurized air, supplied from the first robot arm 108 via the coupling tool piece 123. When a second robot arm 109 is coupled to the wrapping tool 110 at the left side of the tool to the coupling tool piece 122, the motor 132 and the roll fixture 140, 141 are actuated by means of pneumatic power from the second robot arm 109 via the coupling tool piece 122. During a phase, typically a handover phase, when the first robot arm 108 and the second robot arm 109 are both engaged with the wrapping tool 110, the motors 132, 133 and roll fixture 140, 141 are simultaneously actuated or actuatable by the respective first 108 and second 109 robot arms. In other embodiments, the motors 132, 133 and/or the roll fixture 140, 141 are actuatable for example by electric or hydraulic power.

As shown in FIGS. 1 and 2a, the robot arms 108, 109 may each comprise a wrapping material clamp 146 configured to hold a strip of wrapping material, preferably mounted close to the distal end of the robot arm 108, 109. However, such wrapping material clamps 146 may alternatively form a part of the wrapping tool 110.

Figure 3:
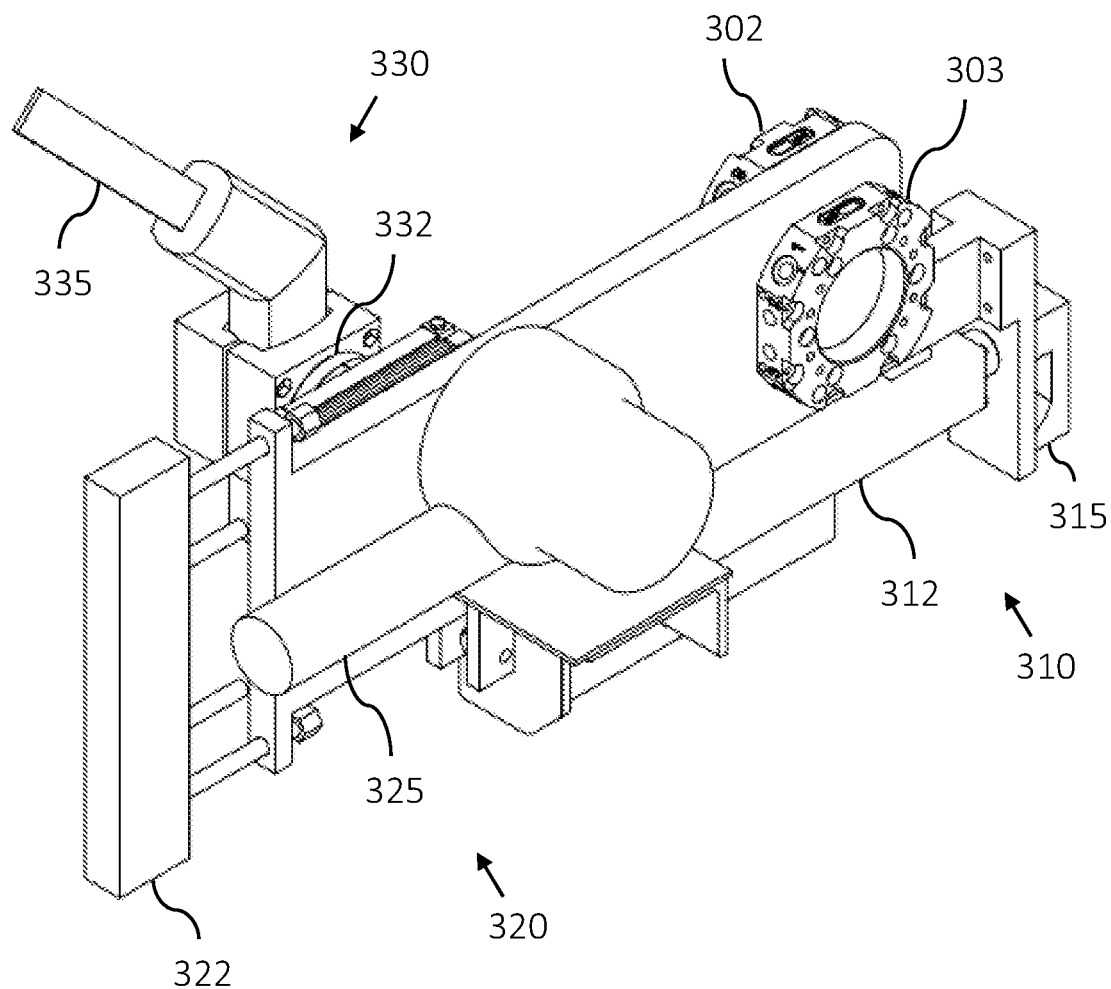
FIG. 3 shows an end attachment tool, in accordance with one or more embodiments described herein.
Figure 4A:
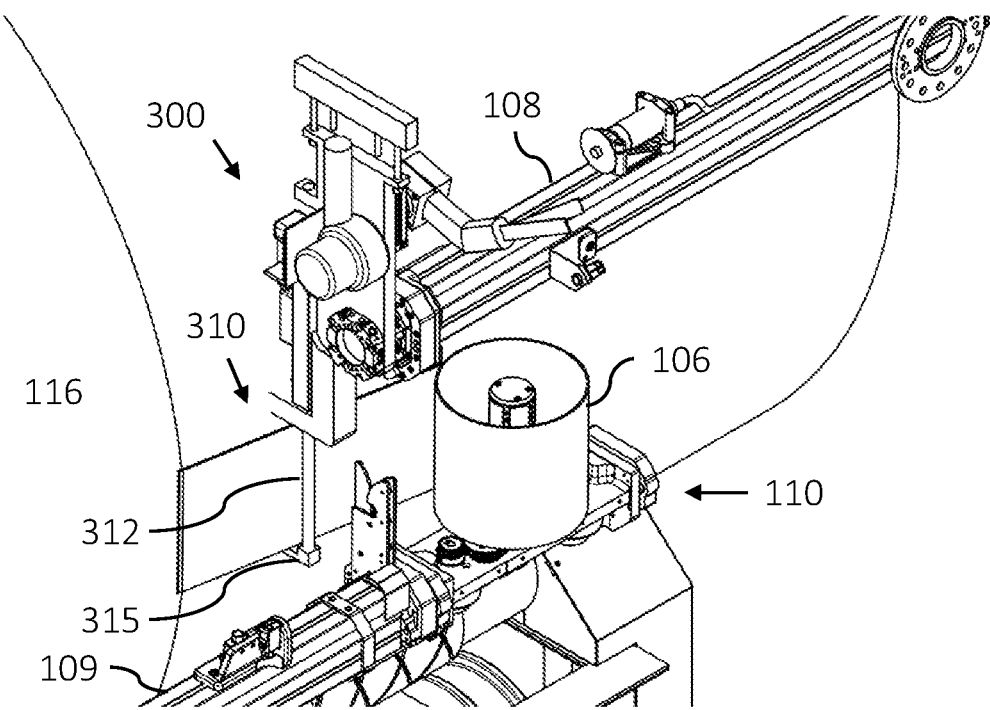
FIGS. 4a-b show how the end attachment tool of FIG. 3 may be used in a system for sheet coil packaging using a roll of wrapping material.
Figure 4B:
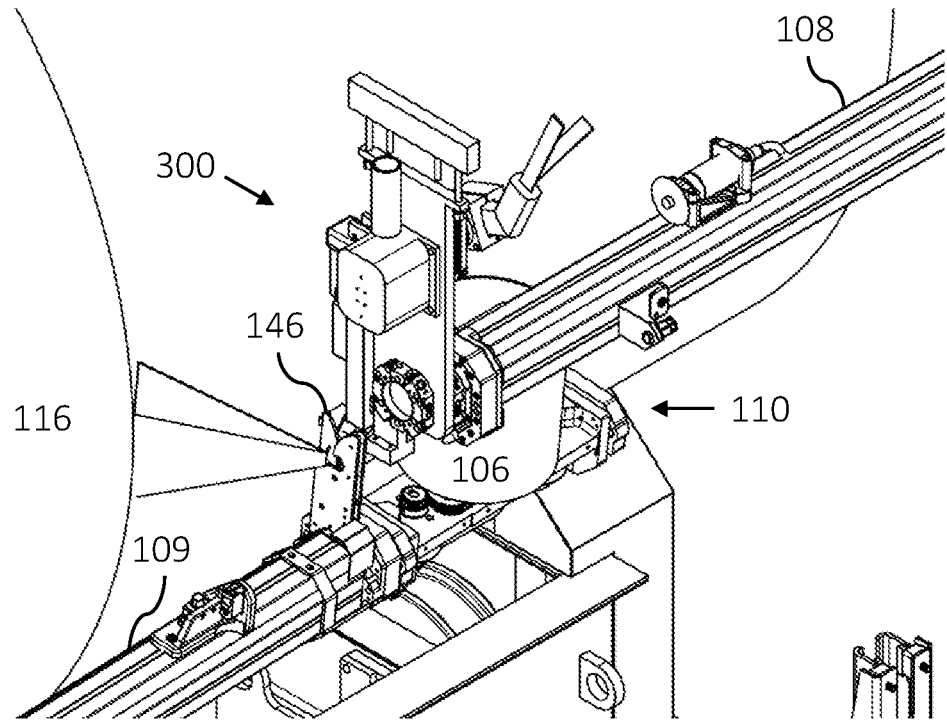

FIG. 3 shows an embodiment of an end attachment tool 300. The end attachment tool 300 is configured to be coupled to a robot arm 108, 109 of an industrial robot 112, 113 in a system 100 for sheet coil packaging using a wrapping tool 110 carrying roll 106 of wrapping material. The end attachment tool 300 preferably comprises a coupling tool piece 302, 303, which configured to be mated with a coupling robot piece 124, 125 of one of the robot arms 108, 109, while the other robot arm 108, 109 still carries the wrapping tool 110, at the end of the wrapping. The robot arms 108, 109 then work together to attach the end of the wrapping material to the wrapping on the sheet coil 116, as illustrated in FIGS. 4a-b. The illustrated end attachment tool 300 comprises a grabbing arrangement 310, a heating arrangement 320, and a cutting arrangement 330.

The grabbing arrangement 310 is arranged to grab the wrapping material, in order to place it into the wrapping material clamp 146 of the robot arm 108, 109 carrying the wrapping tool 110. The robot arm 108, 109 carrying the end attachment tool 300 is arranged to grab the wrapping material using the grabbing arrangement 320, and place the wrapping material into a wrapping material clamp 146 of the robot arm 108, 109 carrying the wrapping tool 110. The illustrated grabbing arrangement 310 comprises a grabbing device 315 and an actuator 312, arranged to extend the grabbing device 315 from the end attachment tool 300, in order for the grabbing device 315 to grab the wrapping material and place it into the wrapping material clamp 146.

The heating arrangement 320 is arranged to attach wrapping material from the roll 106 of wrapping material to wrapping on a sheet coil 116, by heating the wrapping material. The robot arm 108, 109 carrying the end attachment tool 300 is arranged to move the end attachment tool 300 so that the heating arrangement 320 becomes positioned to heat the wrapping material, preferably while the robot arm 108, 109 carrying the wrapping tool 110 positions it so that the wrapping material maintains tension during the heating. The illustrated heating arrangement 320 comprises a pressing device 322, arranged to press the wrapping material against the wrapping on the sheet coil 116, and a heating device 325, arranged to heat the wrapping material as it is pressed against the wrapping on the sheet coil 116. The illustrated pressing device 322 is a spring-loaded pressure plate, and the illustrated heating device 325 is a heat gun, arranged to slightly melt the wrapping material as it is pressed against the wrapping on the sheet coil 116. In embodiments, the heating arrangement thus comprises a heat gun.

The cutting arrangement 330 is arranged to cut off the end of the wrapping material from the roll 106 when the wrapping material has been attached to the wrapping on a sheet coil 116. The robot arm 108, 109 carrying the end attachment tool 300 is arranged to cut off the end of the wrapping material from the roll 106 using the cutting arrangement 330, while the robot arm 108, 109 carrying the wrapping tool 110 positions it so that the wrapping material maintains tension during the cutting. The cutting arrangement 330 may in embodiments comprise a cutting device 325 and a rotary actuator 322, arranged to plunge the cutting device 325. The illustrated cutting arrangement 330 comprises a hot knife 325, and a rotary actuator 322, arranged to plunge the hot knife 325. The cutting device 325 may of course be a regular knife instead of a hot knife.

When the wrapping of a sheet coil 116 has finished, the robot arm 108, 109 currently carrying the wrapping tool 110, e.g. the second robot arm 109, keeps carrying the wrapping tool 110, while the other robot arm 108, 109, e.g. the first robot arm 108, instead couples to the end attachment tool 300. The second robot arm 109 then holds the wrapping tool 110 so that the roll 106 of wrapping material is positioned outside the sheet coil 116, in a position beside the longitudinal part of the sheet coil 116.

The grabbing arrangement 310 of the end attachment tool 300 then grabs the wrapping material and places it into a wrapping material clamp 146 of the second robot arm 109. When using the illustrated grabbing arrangement 310, this is preferably effected by rotating the end attachment tool 300 so that the grabbing arrangement 310 becomes directed downwards. The actuator 312 then extends the grabbing device 315 downwards from the end attachment tool 300, so that the wrapping material can be grabbed by the grabbing device 315. This is illustrated in FIG. 4a.

The actuator 312 then retracts the grabbing device 315, so that the wrapping material is lifted. The first robot arm 108 then moves the end attachment tool 300 in such a way that the wrapping material becomes pushed down into the wrapping material clamp 146 of the second robot arm 109. This is illustrated in FIG. 4b. The grabbing arrangement 310 then releases the wrapping material, and the actuator 312 retracts the grabbing device 315 back to the end attachment tool 300.

The heating arrangement 320 of the end attachment tool 300 then attaches the wrapping material to the wrapping on the sheet coil 116. When using the illustrated heating arrangement 320, this is preferably effected by rotating the end attachment tool 300 so that the heating arrangement 320 becomes horizontal, directed towards the sheet coil 116. The pressing device 322 (e.g. a spring-loaded pressure plate) then presses the wrapping material against the wrapping on the sheet coil 116, in a position between the edge of the sheet coil 116 and the wrapping material clamp 146 of the second robot arm 109. The heating device 325 then slightly melts the wrapping material as it is pressed against the wrapping on the sheet coil 116. If the heating device 325 is a heat gun, as in the illustrated heating arrangement 320, the heat gun may in embodiments be moved, e.g. using a rotary actuator (which may be the same as the rotary actuator 322 used in the cutting arrangement 330), so as to heat the entire width of the wrapping material. The pressing device 322 then releases the wrapping material, which stays attached to the wrapping on the sheet coil 116.

The cutting arrangement 330 of the end attachment tool 300 then cuts off the end of the wrapping material from the roll 106. When using the illustrated cutting arrangement 330, this is preferably effected by positioning the end attachment tool 300 so that the wrapping material comes within reach of the cutting arrangement 330, between the position where the wrapping material has become attached to the wrapping on the sheet coil 116, and the wrapping material clamp 146 on the second robot arm 109. The second robot arm 109 preferably positions the wrapping tool 110 so that the wrapping material maintains tension during the cutting. The cutting device 325 then cuts the wrapping material. The cutting device 325 may in embodiments be plunged using a rotary actuator 322, especially if the cutting device 325 is a hot knife, as in the illustrated cutting arrangement 330. The cutting device 325 may of course be any kind of knife type instrument, not just a hot knife.

Other types of end attachment tools may of course be used instead of the illustrated end attachment tool 300. The heating arrangement 320 may instead e.g. have the form of a heated plate that is pressed onto the wrapping material, thereby melting it slightly and attaching it to the wrapping on the sheet coil 116.

Since the wrapping material is preferably held by the wrapping material clamp 146 of the robot arm 108, 109 carrying the wrapping tool 110 when the wrapping material is cut off, the remaining wrapping material on the roll 106 is immediately ready for a new wrapping procedure.

The wrapping material may e.g. be a plastic stretch film.

A system 100 for sheet coil packaging using a roll 106 of wrapping material may thus comprise: a sheet coil rotating arrangement 120, arranged to rotate a sheet coil 116; a wrapping tool 110, carrying a roll 106 of wrapping material; an end attachment tool 300, comprising a heating arrangement 320; and first 112 and second 113 industrial robots, having first 108 and second 109 robot arms, each arranged to be able to carry either the wrapping tool 110 or the end attachment tool 300, wherein the first 108 and second 109 robot arms are arranged to: wrap the sheet coil 116 using sequences of the first robot arm 108 inserting the wrapping tool 110 into a central hole 118 of the sheet coil 116 and handing over the wrapping tool 110 to the second robot arm 109, and the second robot arm 109 transporting the wrapping tool 110 along the outside of the sheet coil 116 and handing it back to the first robot arm 108, as the sheet coil 116 is rotated by the sheet coil rotating arrangement 120; and attach wrapping material from the roll 106 of wrapping material to the wrapping on the sheet coil 116 by heating the wrapping material using the heating arrangement 320, by the first robot arm 108 moving the end attachment tool 300 so that the heating arrangement 320 becomes positioned to heat the wrapping material, preferably while the second robot arm 109 positions the wrapping tool 110 so that the wrapping material maintains tension during the heating. Such a system 100 allows for a simple attachment of the end of the wrapping material after the wrapping of a sheet coil 116.

In embodiments, the end attachment tool 300 comprises a grabbing arrangement 320, and the first robot arm 108 is arranged to grab the wrapping material using the grabbing arrangement 320, and place the wrapping material into a wrapping material clamp 146 of the second robot arm 109, while the second robot arm 109 carries the wrapping tool 110.

In embodiments, the end attachment tool 300 comprises a cutting arrangement 330, and the first robot arm 108 is arranged to cut off the end of the wrapping material from the roll 106 using the cutting arrangement 330, while the second robot arm 109 positions the wrapping tool 110 so that the wrapping material maintains tension during the cutting.

Figure 5:
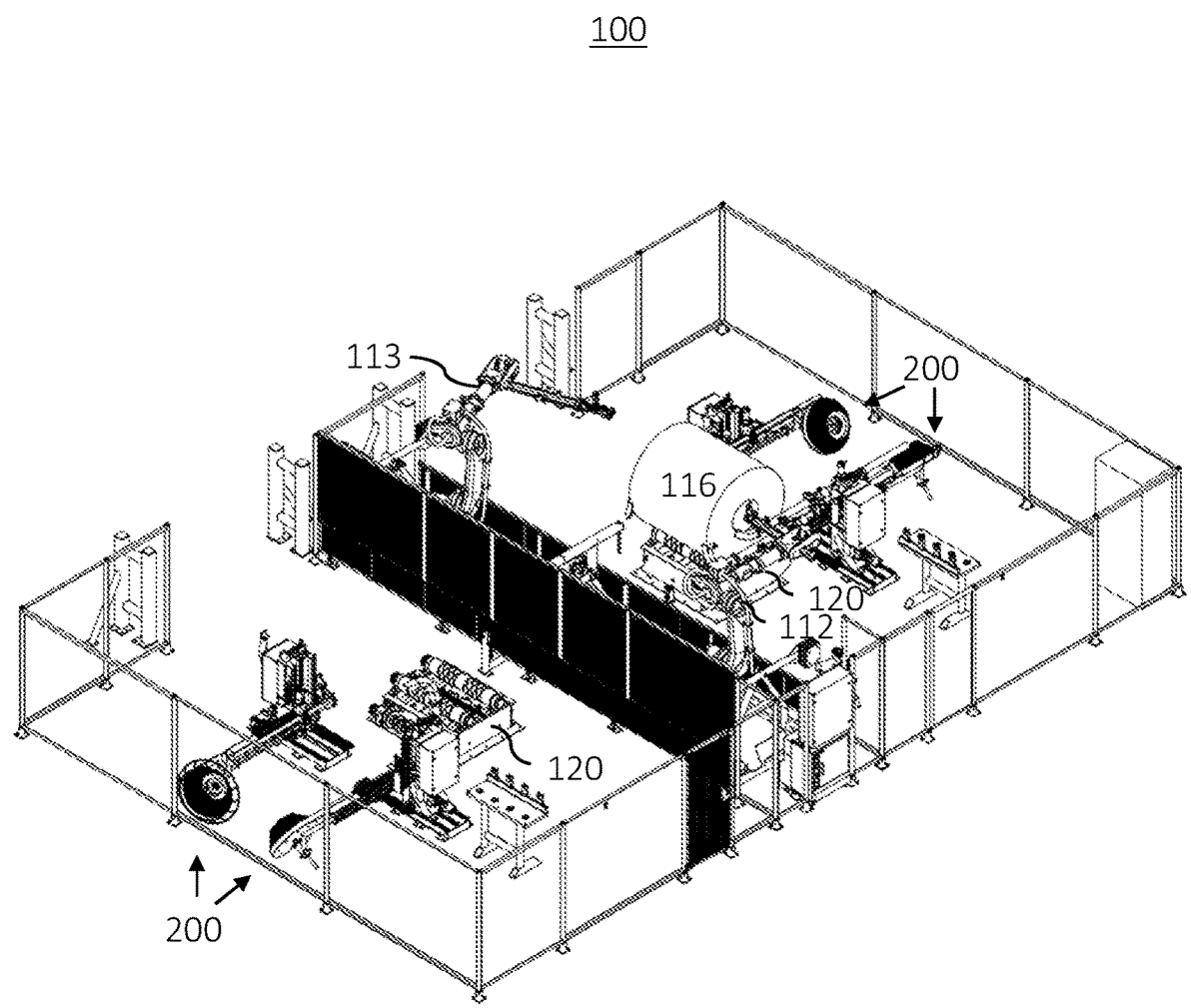
FIG. 5 shows a system for sheet coil packaging using a roll of wrapping material, in accordance with one or more embodiments described herein.
Figure 6A:
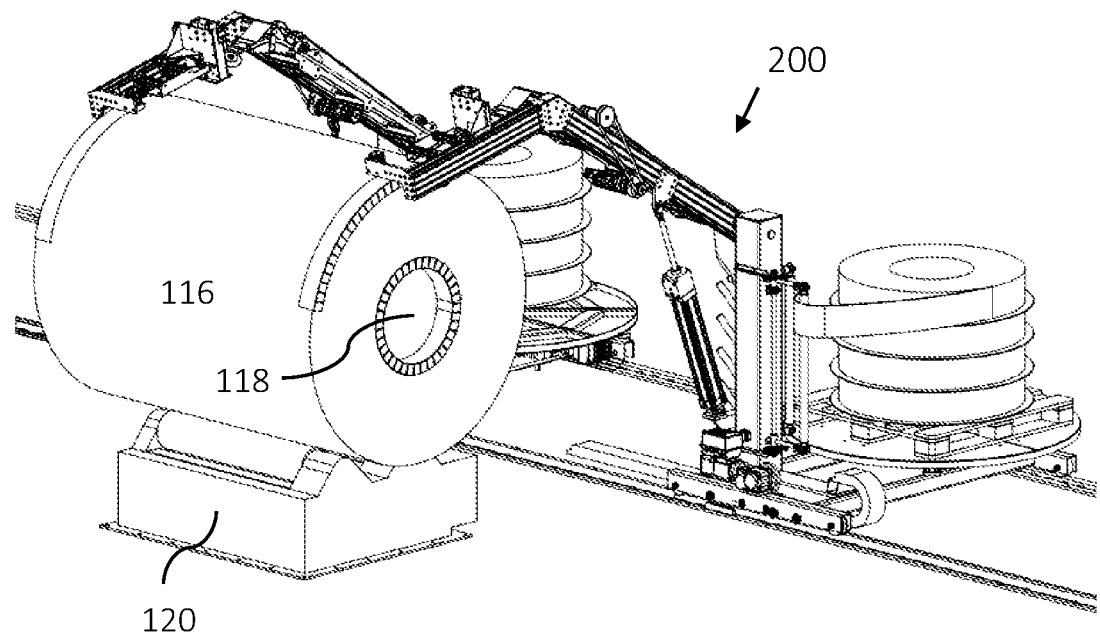
FIGS. 6a-b show different embodiments of edge protection mounting devices which may be used in a system for sheet coil packaging, in accordance with one or more embodiments described herein.
Figure 6B:
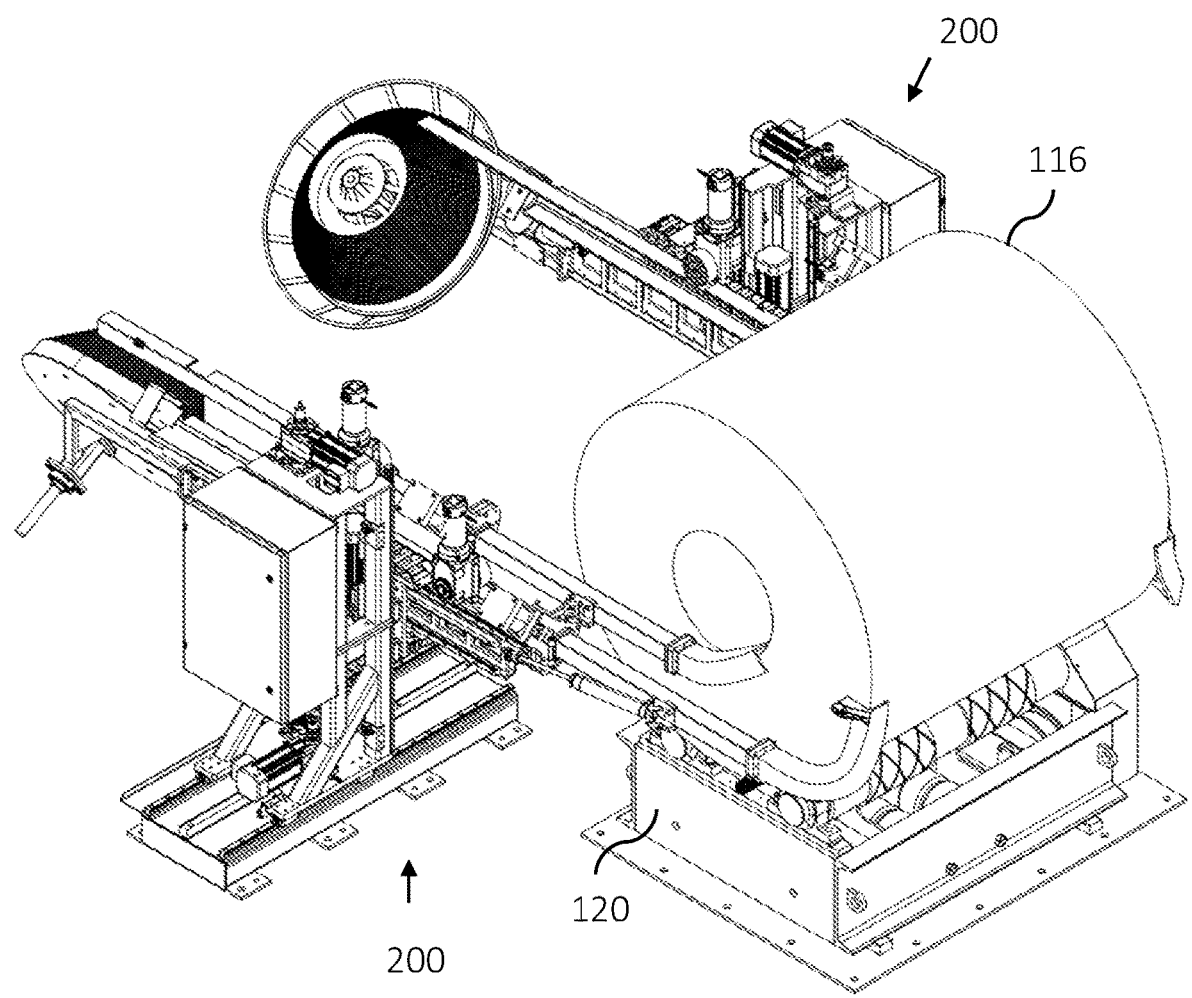

FIG. 5 shows a system 100 for sheet coil packaging, and FIGS. 6a-b show different embodiments of edge protection mounting devices 200 which may be used in a system 100 for sheet coil packaging. The system 100 illustrated in FIG. 5 comprises two industrial robots 112, 113, and two pairs of edge protection mounting devices 200, each pair arranged together with a sheet coil rotating arrangement 120 arranged to rotate a sheet coil 116 to enable it to be wrapped. The sheet coil wrapping arrangement 112, 113 is arranged to wrap a sheet coil 116 as the sheet coil 116 is rotated by the sheet coil rotating arrangement 120. The sheet coil 116 is thus preferably wrapped in synchronization with the feeding out of edge protection material from edge protection mounting devices 200, so that the edge protection material becomes fixed to the sheet coil 116 by the wrapping as the sheet coil 116 is rotated by the sheet coil rotating arrangement 120.

In the system 100 illustrated in FIG. 5, the same two industrial robots 112, 113 may wrap sheet coils 116 on sheet coil stations on either side of the industrial robots 112, 113 in synchronization with the feeding out of edge protection material from the currently active pair of edge protection mounting devices 200, so that the edge protection material becomes fixed to the sheet coil 116 by the wrapping as the sheet coil 116 is rotated by the sheet coil rotating arrangement 120. However, the system 100 may comprise only one sheet coil station, and thus only one pair of edge protection mounting devices 200 and one sheet coil rotating arrangement 120.

Since it is desirable to have edge protection material on both sides of the sheet coil 116, there are preferably two edge protection mounting devices 200, one arranged at either end of the sheet coil 116. Two edge protection mounting devices 200 may thus be arranged at opposite ends of a sheet coil 116, to feed out and guide edge protection material 400 into correct positions along the edges of the sheet coil 116 as the sheet coil 116 is rotated by the sheet coil rotating arrangement 120. A system 100 for sheet coil packaging may thus further comprise edge protection mounting devices 200.

Method Embodiments

Figure 7:
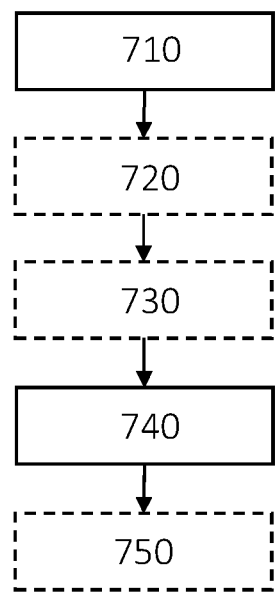
FIG. 7 schematically illustrates a method for sheet coil packaging using a roll of wrapping material, in accordance with one or more embodiments described herein.

FIG. 7 schematically illustrates a method 700 for sheet coil packaging using a roll 106 of wrapping material. The method 700 may comprise:

Step 710: wrapping a sheet coil 116 using first 112 and second 113 industrial robots, having first 108 and second 109 robot arms, arranged to wrap the sheet coil 116 using a wrapping tool 110 carrying a roll 106 of wrapping material, wherein the wrapping 710 of the sheet coil 116 comprises using sequences of the first robot arm 108 inserting the wrapping tool 110 into a central hole 118 of the sheet coil 116 and handing over the wrapping tool 110 to the second robot arm 109, and the second robot arm 109 transporting the wrapping tool 110 along the outside of the sheet coil 116 and handing it back to the first robot arm 108, as the sheet coil 116 is rotated by the sheet coil rotating arrangement 120.

Step 740: attaching the wrapping material from the roll 106 of wrapping material to the wrapping on the sheet coil 116 by heating the wrapping material using a heating arrangement 320 comprised in an end attachment tool 300, wherein the attaching 740 of the wrapping material comprises using the first robot arm 108 to position the end attachment tool 300 so that the heating arrangement 320 becomes positioned to heat the wrapping material.

Such a method 700 allows for a simple attachment of the end of the wrapping material after the wrapping of a sheet coil 116.

In embodiments, the attaching 740 of the wrapping material further comprises using the second robot arm 109 to position the wrapping tool 110 so that the wrapping material maintains tension during the heating.

The method 700 may further comprise one or more of:

Step 720: grabbing the wrapping material using a grabbing arrangement 320 comprised in the end attachment tool 300.

Step 730: placing the wrapping material into a wrapping material clamp 146 of the second robot arm 109, while the second robot arm 109 carries the wrapping tool 110.

Step 750: cutting off the end of the wrapping material from the roll 106 using a cutting arrangement 330 comprised in the end attachment tool 300, while the second robot arm 109 positions the wrapping tool 110 so that the wrapping material maintains tension during the cutting.

In embodiments, the heating arrangement 320 comprises a heat gun.

In embodiments, the wrapping material is a plastic stretch film.

In embodiments, the sheet coil 116 is a sheet metal coil.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Accordingly, the scope of the invention is defined only by the claims.

The invention claimed is:

1. An end attachment tool configured to be coupled to a robot arm of an industrial robot in a system for sheet coil packaging using a roll of wrapping material, wherein the end attachment tool comprises a heating arrangement, arranged to attach wrapping material from the roll of wrapping material to wrapping on a sheet coil by heating the wrapping material.

2. The end attachment tool according to claim 1, wherein the end attachment tool comprises a grabbing arrangement, arranged to grab the wrapping material in order to place it into a wrapping material clamp of a robot arm carrying the roll of wrapping material.

3. The end attachment tool according to claim 1, wherein the end attachment tool comprises a cutting arrangement, arranged to cut off the end of the wrapping material from the roll when the wrapping material has been attached to the wrapping on the sheet coil.

4. A system for sheet coil packaging using a roll of wrapping material, the system comprising:
   a sheet coil rotating arrangement, arranged to rotate a sheet coil;
   a wrapping tool, carrying a roll of wrapping material;
   an end attachment tool, comprising a heating arrangement; and
   first and second industrial robots, having first and second robot arms, each arranged to be able to carry either the wrapping tool or the end attachment tool, wherein the first and second robot arms are arranged to:
   wrap the sheet coil using sequences of the first robot arm inserting the wrapping tool into a central hole of the sheet coil and handing over the wrapping tool to the second robot arm, and the second robot arm transporting the wrapping tool along the outside of the sheet coil and handing it back to the first robot arm, as the sheet coil is rotated by the sheet coil rotating arrangement; and
   attach wrapping material from the roll of wrapping material to the wrapping on the sheet coil by heating the wrapping material using the heating arrangement, by the first robot arm moving the end attachment tool so that the heating arrangement becomes positioned to heat the wrapping material.

5. The system according to claim 4, wherein the second robot arm is arranged to position the wrapping tool so that the wrapping material maintains tension during the heating.

6. The system according to claim 4, wherein the end attachment tool comprises a grabbing arrangement, and the first robot arm is arranged to grab the wrapping material using the grabbing arrangement, and place the wrapping material into a wrapping material clamp of the second robot arm, while the second robot arm carries the wrapping tool.

7. The system according to claim 4, wherein the end attachment tool comprises a cutting arrangement, and the first robot arm is arranged to cut off the end of the wrapping material from the roll using the cutting arrangement, while the second robot arm positions the wrapping tool so that the wrapping material maintains tension during the cutting.

8. The system according to claim 4, wherein the wrapping material is a plastic stretch film.

9. The system according to claim 4, wherein the sheet coil is a sheet metal coil.

10. A method for sheet coil packaging using a roll of wrapping material, the method comprising:
    wrapping a sheet coil using first and second industrial robots, having first and second robot arms, arranged to wrap the sheet coil using a wrapping tool carrying a roll of wrapping material, wherein the wrapping of the sheet coil comprises using sequences of the first robot arm inserting the wrapping tool into a central hole of the sheet coil and handing over the wrapping tool to the second robot arm, and the second robot arm transporting the wrapping tool along the outside of the sheet coil and handing it back to the first robot arm, as the sheet coil is rotated by a sheet coil rotating arrangement; and
    attaching the wrapping material from the roll of wrapping material to the wrapping on the sheet coil by heating the wrapping material using a heating arrangement comprised in an end attachment tool, wherein the attaching of the wrapping material comprises using the first robot arm to position the end attachment tool so that the heating arrangement becomes positioned to heat the wrapping material.

11. The method according to claim 10, wherein the attaching of the wrapping material further comprises using the second robot arm to position the wrapping tool so that the wrapping material maintains tension during the heating.

12. The method according to claim 10, further comprising:
    grabbing the wrapping material using a grabbing arrangement comprised in the end attachment tool; and
    placing the wrapping material into a wrapping material clamp of the second robot arm, while the second robot arm carries the wrapping tool.

13. The method according to claim 10, further comprising cutting off the end of the wrapping material from the roll using a cutting arrangement comprised in the end attachment tool, while the second robot arm positions the wrapping tool so that the wrapping material maintains tension during the cutting.

14. The method according to claim 10, wherein the wrapping material is a plastic stretch film.

15. The method according to claim 10, wherein the sheet coil is a sheet metal coil.

\* \* \* \* \*